United States Patent

[11] 3,586,443

[72] Inventor Gerald E. Hooper
La Canada, Calif.
[21] Appl. No. 723,188
[22] Filed Apr. 22, 1968
[45] Patented June 22, 1971
[73] Assignee Cary Instruments
Monrovia, Calif.

[54] CIRCULAR DICHROISM MEASUREMENT SYSTEM
26 Claims, 8 Drawing Figs.
[52] U.S. Cl. .................................. 356/114,
250/225, 356/117
[51] Int. Cl. ........................................ G01n 21/40
[50] Field of Search .......................... 356/114,
116, 117; 250/225

[56] References Cited
UNITED STATES PATENTS
3,257,894 6/1966 Grosjean ..................... 356/117

| 3,345,907 | 10/1967 | Wada ........................... | 356/116 |
| 3,442,592 | 5/1969 | Grosjean ..................... | 356/80 |
| 3,446,557 | 5/1969 | Wilkinson .................... | 356/225 |

OTHER REFERENCES
Hariharan and Bhalla, JOURNAL OF OPTICAL SOCIETY OF AMERICA, Vol. 47, 5 May 1957, pp. 378—381

Primary Examiner—Ronald L. Wibert
Assistant Examiner—J. Rothenberg
Attorney—White and Haefliger ABSTRACT: The disclosure concerns the provision of means for significantly reducing certain inaccuracies associated with circular dichroism measurement, and in which a certain signal (alternately proportional to sample characteristic transmission values for predominantly right-circularly polarized light and left-circularly polarized light) is processed to produce a modified signal proportional (within a predetermined additive constant) to the logarithm of the certain signal, the AC component of the modified signal being used in indicating the value of circular dichroism.

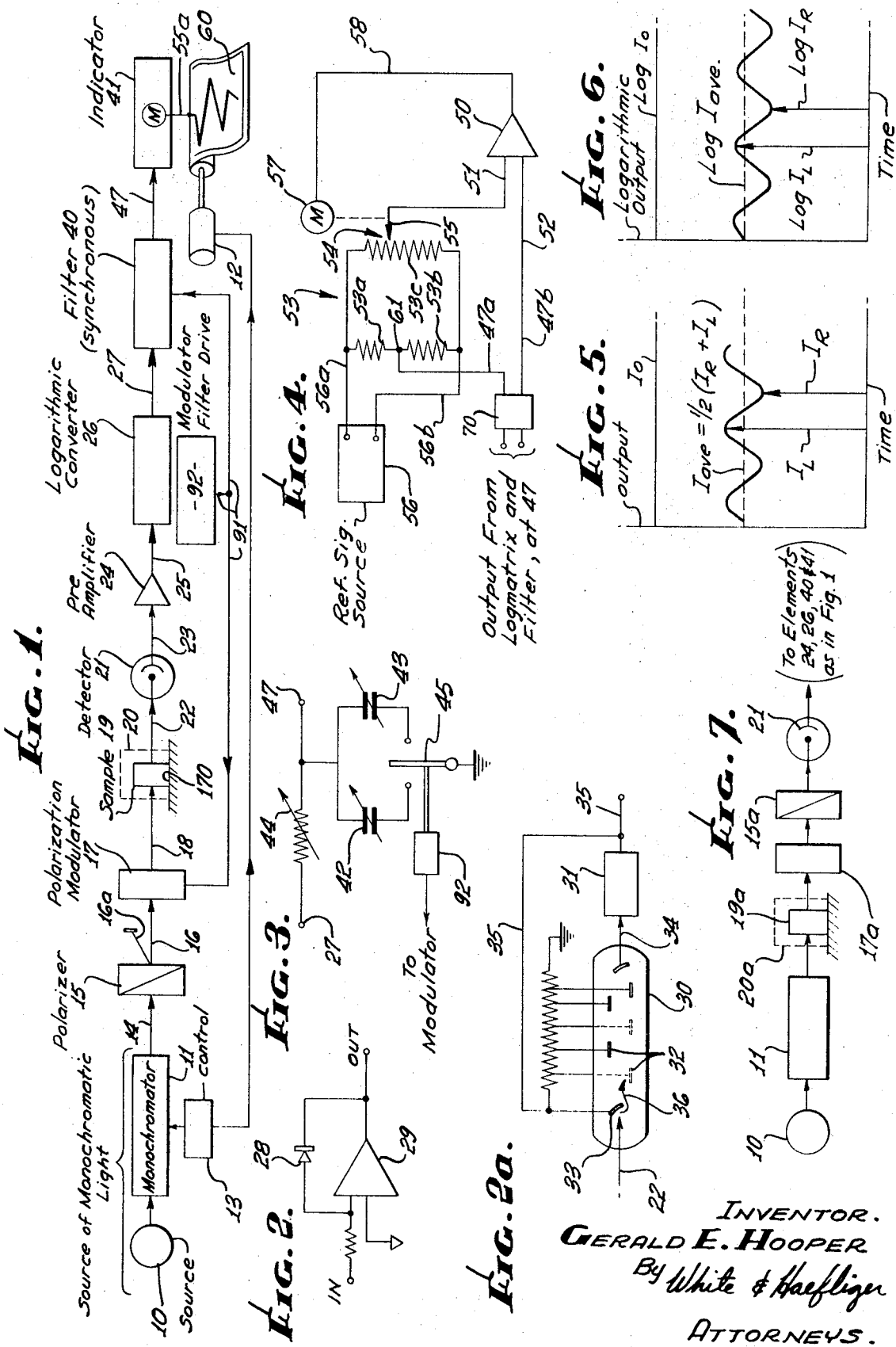

CIRCULAR DICHROISM MEASUREMENT SYSTEM

BACKGROUND OF THE INVENTION

This invention relates generally to instrumentation for making circular-dichroism measurements with polarized light. More specifically, the invention concerns improving the accuracy of such measurements.

In the past, and as exemplified in U.S. Pat. 3,257,894, the measurement of circular-dichroism (a very useful optical property of substances, and defined as the difference in absorption of an optically active sample when determined using left-circularly polarized light and right-circularly polarized light), has involved the step of obtaining the ratio of alternating and direct current components of an electrical signal obtained at the output of a detector such as a phototube. Light incident upon the detector, and resulting in production of that signal, is typically derived by transmission as a beam from a source including a monochromator and through a polarizer, then through a polarization or electro-optic modulator wherein the plane polarized light is elliptically polarized in a cyclically varying manner (characterized by two counterrotating, circularly polarized components, the relative magnitudes of the two components changing cyclically in time—at a "modulation frequency"—so that the dominant component is alternately right- and left-circularly polarized), and finally through a sample. The latter, when circular-dichroic, absorbs unequally the circularly polarized components of opposite sense and of periodically varying relative magnitude, so that the total amount of light incident upon the phototube undergoes a corresponding periodic variation, i.e. larger when the predominant circularly polarized component of the light passing through the sample is of the sense absorbed to lesser degree by the sample, and smaller when the predominant circularly polarized component is of the sense absorbed to greater degree by the sample. The fluctuating component of the phototube output is of frequency equal to the modulation frequency and with amplitude proportional to the difference between transmission levels for the circularly polarized components of opposite sense. The DC component on the other hand corresponds to the average or mean transmission of the sample for light at the wavelength of interest.

It is found in practice that the above ratio method at best yields an approximation to the true value of circular dichroism, and is characterized in certain cases by objectionable inaccuracy. For example, the error in the approximation can become a significant fraction of 1 percent with samples in which the dichroism is as large as one-tenth of the average value of the absorbance of the sample.

SUMMARY OF THE INVENTION

It is a major object of the invention to provide a means for significantly reducing the inaccuracies associated with circular dichroism measurement, thereby obviating the problem referred to above.

The environment of the invention typically includes a system having a zone to receive a dichroic sample, a light responsive detector, and means for transmitting a beam of light to the detector via the sample, such means including a polarization modulator located in the path of the beam and operable to cause the resultant output of the detector to vary cyclically in alternating correspondence to transmission of right- and left-circularly polarized light by the sample. The invention embodied in this particular environment basically comprises signal processing means (which may typically include a logarithmic amplifier) having electrical connection to the detector for processing the detector output to obtain output values substantially proportional to log $I_L$ and log $I_R$, where $I_R$ equals the detector output during an interval of detection of transmission of predominantly right-circularly polarized light, and $I_L$ equals the detector output during an interval of detection of transmission of predominantly left-circularly polarized light; and circuitry responsive to the processed output to derive the magnitude of the difference between such output values. Stated somewhat differently, the signal processing means and circuitry are typically operable to produce a modified signal substantially proportional (within a predetermined additive constant) to the logarithm of the signal generated by the detector, and to produce an AC component of that modified signal, the amplitude of that AC component representing the difference between log $I_R$ and log $I_L$.

Additional objects and advantages of the invention typically include:

the provision of means to display the modified signal amplitude, and with a positive or negative value therefor depending upon which one of the values log $I_L$ and log $I_R$ is larger than the other;

the provision of optical wavelength selecting means for selecting light of a nominal wavelength for transmission to the detector, and limiting the width of the band wavelengths of said light about said nominal or substantially central wavelength, together with a control to which both the wavelength selecting means and display means are responsive so that the display may automatically record sequential measured values of circular dichroism at different bands of wavelengths;

the provision of a detector in the form of a photomultiplier having a photocathode and the logarithmic amplifier in the form of either (1) a conventional electronic amplifier having in its feedback loop an element whose voltage-to-current characteristic is logarithmic, or (2) dynodes together with an anode of the photomultiplier;

the provision of the above-mentioned difference deriving circuitry in the form of a synchronous filter converting the approximately sinusoidal output signal of the logarithmic amplifier to a rectangular-wave output, implementing the derivation of relatively noise-free circular dichroism measurement;

and the provision of a recording circuit of unusually advantageous utility in conjunction with the synchronous filter, as will be described.

These and other objects and advantages of the invention, as well as the details of illustrated embodiments, will be more fully understood from the following detailed description of the drawings, in which:

BRIEF DESCRIPTION OF THE DRAWINGS

FIG. 1 is a schematic showing of a system incorporating the invention, for measuring circular dichroism of a test sample;

FIGS. 2 and 2a are schematic showings of two forms of logarithmic amplifiers that may be used in the FIG. 1 system;

FIG. 3 is a network representative of one form of synchronous device (filter) usable in FIG. 1;

FIG. 4 is a network representative of one form of indicator or recording device especially useful in the FIG. 1 system;

FIG. 5 is a waveform representative of the output of the FIG. 1 detector;

FIG. 6 is a waveform representative of the output of the FIG. 1 logarithmic converter or logmatrix; and FIG. 7 is a schematic showing of a substitute portion of an optical system usable in FIG. 1.

DESCRIPTION OF PREFERRED EMBODIMENTS

In the system of FIG. 1, the element 10 designated "source" emits electromagnetic radiation as a continuum over a relatively broad range of wavelengths, which may be in the visible, infrared and/or ultraviolet portions of the electromagnetic spectrum. The term "light" will be used to designate any of such radiation. The monochromator 11 has the function of selecting from this continuum a relatively narrow band of wavelengths for use in measuring the circular dichroism of the sample, as is known. Depending upon the application, the monochromator may be a relatively coarse apparatus, or a fine high-resolution device such as that employed in the Model 15 Automatic Recording Spectrophotometer produced by Cary Instruments, Monrovia, Cal. A drive 12 may be coupled via scan control 13 to the monochromator to cause it sequentially to select different narrow wavelength bands of radiation for transmission at 14, the arrangement being such that the nominal or central wavelengths of the selected bands form the locus of a smoothly varying function of time—a monotonic function—of approximately constant slope.

From the beam 14 leaving the monochromator, a substantially plane polarized component is selected by the polarizer element 15 and transmitted at 16 as, for example, the ordinary beam, the extraordinary beam 16a being suitably eliminated. (Of course the extraordinary beam may be used and the ordinary beam eliminated; while in the case of a dichroic polarizer, which may alternatively be employed, there is only one output beam.) See in this regard the Model 60 Spectropolarimeter, an apparatus manufactured by Cary Instruments, as well as the article "Circular Dichroism Theory and Instrumentation," by Abu-Shumays and Duffield, Analytical Chemistry, Vol. 38, June 1966.

Plane polarized light at 16 is incident upon the modulator 17, of known construction (see for example, the above-referenced Abu-Shumays and Duffield article) so that light leaving the modulator at 18 is in general elliptically polarized, i.e., having electric and magnetic vectors each of whose tips describes an ellipse, in time, when projected onto a plane perpendicular to the direction of light propagation. Such light may be considered equivalent to two counterrotating circularly polarized components vectorially added, the relative magnitudes of the two components determining the magnitude of the ellipticity. The algebraic sign of the ellipticity is determined by the direction of rotation of the resultant vector, i.e., by the "sense" of the larger circularly polarized component.

The modulator 17 is operable to vary cyclically the ellipticity of elliptically polarized light 18, between positive and negative values in alternation; that is, the left- and right-circularly polarized components are made predominant alternately. In one preferred embodiment this cyclical variation of the ellipticity is continuous and smooth—and in fact nearly sinusoidal—but "step-function" modulation (i.e., stepwise alternation between essentially all left- and essentially all right-circularly polarized light) is also acceptable, and in many cases preferable.

Light leaving the modulator at 18 is incident upon the sample 19 (supported at 170, or by an equivalent holder, in zone 20), which absorbs unequally the circularly polarized components of opposite "sense." Consequently, as the ellipticity periodically changes sign, the intensity of the light transmitted at 22 by the sample undergoes a corresponding periodic variation, i.e. larger when the light passing through the sample possesses a predominant circularly polarized component of the sense absorbed to lesser degree by the sample, and smaller when the predominant circularly polarized component is of the sense absorbed to greater degree by the sample. This periodic intensity variation is of course resolvable into fluctuating and "steady" or "constant" components.

A detector such as phototube 21 receives both the fluctuating and the steady components of light flux transmitted from the sample at 22, and produces a corresponding current output which contains both fluctuating and steady components. The fluctuating component is approximately sinusoidal AC of frequency equal to the frequency of the modulator and odd harmonics thereof, and corresponds in magnitude to the difference between the transmission levels for the circularly polarized components of opposite sense. The steady or DC component corresponds in magnitude to the average or mean transmission of the sample for light in general, at the wavelength of interest.

The phototube output signal at 23 passes through a preamplifier 24, which may be as used in the Model 6001 Circular Dichroism Accessory manufactured by Cary Instruments, and then to signal processing means. The latter, designated by the logarithmic converter block 26, processes the signal input 25 to obtain a modified signal at 27 substantially proportional (within a predetermined additive constant) to the logarithm of the input signal 25, and to form an AC component of the modified signal. The converter 26 has a logarithmic response and thus may be designated as a "logmatrix." It may typically comprise a nonlinear device such as a diode 28 (or transistor) in the feedback loop of an operational amplifier 29, as seen in FIG. 2, or a more complicated network for even higher accuracy. For the arrangement illustrated in FIG. 2, and for a conventional photomultiplier-output circuit, preamplifier 24 is preferably an inverting amplifier.

FIG. 2a illustrates another form of converter, wherein the light responsive detector takes the form of a photomultiplier 30, and the "logmatrix" appears as a feedback control 31 for the voltage applied to dynodes 32, of the photomultiplier. Light 22 from the sample is incident upon the photocathode 33, and the response of the feedback control 31 is made to produce such dynode voltage at 35 as is required to maintain the anode-current output at 34 at a predetermined constant value. It can be shown that the resulting dynode voltage appearing at 35 is substantially proportional to the logarithm of the photocathode "space-current" at 36, and therefore to the logarithm of the intensity of light incident at 22.

Depending upon the modulation system used, the signal at the output of the preamplifier 24 may be a square wave, sinusoid, or other form; however, for purposes of illustration, consider it to be sinusoidal as illustrated in FIG. 5, wherein the scale along the axis of ordinates is roughly linear but the magnitude of the AC component relative to the DC component is exaggerated for illustration purposes. The DC component is designated as $I_{ave} = 1/2\,(I_R+I_L)$ where $I_R$ = the detector output during an interval of detection of transmission of predominantly right-circularly polarized light, and $I_L$ = the detector output during an interval of detection of transmission of predominantly left-circularly polarized light.

By passage through the logmatrix 26, the signal is "distorted" to the shape indicated in FIG. 6, wherein the ordinate scale is roughly linear but both the relative magnitude of the AC component, and the magnitude of the "distortion," are exaggerated for purposes of illustration. The AC component will be proportional to the peak-to-peak difference between the logarithms of the peak and trough signals of the preamplifier output; that is, the AC component amplitude will be equal or proportional to:

$$\log I_R - \log I_L = \log \frac{I_R}{I_L} \qquad \text{Eq. 1}$$

By the absorbance-difference definition of circular dichroism, $$\Delta A = A_L - A_R = \log \frac{I_0}{I_L} - \log \frac{I_0}{I_R} = \log \frac{I_0/I_L}{I_0/I_R} = \log \frac{I_R}{I_L} \qquad \text{Eq. 2}$$

where $I_0$ =
the detector output (also shown in FIG. 5) corresponding to the intensity of light entering sample 19 as beam 18.

Comparison of equations 1 and 2 shows that the AC output of the logmatrix is proportional or identical to the true value of circular dichroism.

From the logmatrix or converter 26, the "distorted" signal 27 is in one embodiment passed through a synchronous filter 40, synchronized at 91 with the modulator 17, by the common drive means 92.

In a related embodiment, the order of logmatrix 26 and filter 40 along the signal path may be reversed, and in fact this has certain advantages as to ideality of behavior. In yet another embodiment, filter 40 may be omitted.

In any case signal at 27 or 47 is next directed to a display device 41, as for example an AC voltmeter, strip-chart recorder, or other suitable apparatus. The device or indicator 41 has the function of measuring the amplitude of the distorted AC signal output from the logmatrix, and should be phase sensitive (in order to preserve information as to the algebraic sign of the circular dichroism). If a synchronous filter is used, as shown in the figure, the display device 41 receives a rectangular-wave AC signal and operates on a square wave AC basis to display accurately the rectangular-wave amplitude.

While the output from the logmatrix may be passed directly to the indicator 41, the use of the synchronous filter 40 provides certain additional advantages and functions. For example, it provides a convenient means of adjusting the time constant of the system to allow for recording with either short time constants (for rapid response and therefore rapid acquisition of a complete circular dichroism spectrum) or long time constants (for good noise-averaging where it is desirable to average over long periods to improve the effective signal-to-noise ratio of the display). It also provides shaping of the signal waveform to a rectangular wave for processing by a particular type of phase-sensitive recording system.

FIG. 3 illustrates an advantageous synchronous filter such as may be used at block 40 in FIG. 1. The filter comprises a coupling network having series resistance 44 and parallel capacitors 42 and 43. The network also includes a switch 45 (schematically indicated as a vibrating mechanical contact in the figure) operated in synchronism with the modulator 17, as controlled by means 92, so as to alternately connect resistor 44 in series circuit relation with the respective capacitors 42 and 43 in such manner that the signal at 27 passes into one capacitor while the detector 21 (FIG. 1) receives predominantly left-circularly polarized light, and into the other capacitor while the detector receives predominantly right-circularly polarized light. This causes the signal at the output 47 of the filter to have a nearly rectangular waveform, while the input is a distorted sinusoid as seen in FIG. 6. The rate at which the output signal at 47 can change may be determined by adjustment of the resistor 44 or of the capacitors 42 and 43 (or of both the resistor and the capacitors), and accordingly such adjustment provides a convenient means of adjusting the time-constant of the recording system. Additionally the phase-sensitive characteristic permits very high relative attenuation of (1) quadrature components that may be present, and (2) even-harmonic components. This makes possible a relatively sensitive recording null-balance system which is relatively free of overload difficulties and noise near null, as explained below.

Referring now to FIG. 4, it illustrates one form of unusually advantageous circuitry responsive to the processed output at output 47, for displaying the magnitude of the difference between the values log $I_R$ and log $I_L$. The illustrated circuitry includes a differential amplifier 50 having first and second input terminals 51 and 52, and a resistance bridge 53 including resistance sections 53a and 53b, and a third section 53c which is part of a slidewire potentiometer 54 having a movable element such as "wiper" or sliding contact 55. The circuit also includes a reference signal source 56, and a drive motor 57 responsive to the amplifier output at 58 to move the wiper 55. The bridge is electrically connected with the reference signal source at 56a and 56b, and through wiper 55 with the amplifier input terminal 51. The output from logarithmic converter or logmatrix 26, and from filter 40 if present, shown in FIG. 1 at 47, is applied through connections 47a and 47b to the bridge at point 61 and to amplifier input terminal 52 respectively. The polarity of output signal 58 must be chosen suitably in relation to the internal wiring and mechanical mounting arrangement of motor 57, so that the movable element 55 is driven to a null position wherein the bridge is balanced and the wiper position is representative of the sample circular dichroism. A recording pen extension 55a of the wiper is shown recording on the strip chart 60 in FIG. 1, the chart itself being suitably driven at 12 in the direction perpendicular to recording-pen motion, as a function of monochromator operation, whereby different points along the length of the strip chart represent different light wavelengths, while points across the width of the chart represent circular-dichroism values, and a graph of circular dichroism vs. wavelength is automatically produced.

In particular, when the CD signal is zero, the wiper 55 will move to some "zero" position along slidewire 53c, determined by the relative resistance values of resistance sections 53a and 53b; while pen extension 55a is moved to a corresponding "zero" position along the width of chart 60. For example, if 53a and 53b represent equal resistances, the "zero" position along slidewire 53c will be at the center thereof; on the other hand, if 53a or 53b is made a very small or zero resistance value, the "zero" position along slidewire 53c is thereby moved to the "top" or "bottom" of 53c (as drawn in FIG. 4), respectively. Of course the relative resistance values of 53a and 53b may be made adjustable at the operator's convenience, whereby the "zero" position along slidewire 53c, and, correspondingly, across the width of recorder chart 60, may be selected as desired.

When a nonzero CD signal from the synchronous filter of FIG. 3 is injected in series with the bridge output (for example between the fixed tap 61 and the amplifier input 52) it will add or subtract (depending on the phase) from the signal at the fixed tap 61, thereby changing the input into the amplifier 50. This will produce a rotation of the drive motor 57, bringing the wiper to balance at a new wiper position. The polarity of the signal 47 applied across 47a and 47b, in relation to the polarity of the reference signal applied at 56a and 56b, determines the algebraic sign or "handedness" of the display—that is, the direction on the chart which will represent positive circular dichroism.

It is desired that the drive 57 should stop when the displacement of the wiper from "zero" position causes the differential amplifier to receive just enough incremental signal from the right side of the bridge to balance the CD signal injected in the signal path from the left side of the bridge. If the reference signal and the CD signal do not have the same waveform, then no true balance can be achieved, since there is no fraction of the reference signal which can be tapped off so as to cancel in each moment in time the signal from the synchronous filter. Depending upon the exact nature of the amplifier and motor in use, the result of such imperfect cancellation would be some sort of erratic behavior of the system—that is the instantaneous nonzero voltages at the differential-amplifier input might overload that amplifier; or, such voltages if transmitted through the amplifier to the motor windings, though incapable of producing motor shaft rotation, might cause overheating of the windings; or a systematic error might be introduced causing the pen to balance at an incorrect position.

Accordingly, it is desirable to match the CD signal and the reference signal which drives the bridge. Since the CD signal from the detector is not a pure sinusoid but (because of the nature of the modulation and optical processing) contains various harmonics of the fundamental modulation frequency, it is somewhat difficult to generate a reference signal susceptible of exact cancellation with the CD signal. This problem is compounded by the passage of the CD signal through the logmatrix, introducing further distortion from pure sinusoidal content.

These problems are avoided in the described apparatus by generating at 56 a rectangular-wave reference signal, and using the synchronous filter of FIG. 3 to "square-off" the signal from the logmatrix, thereby making the two signal waveforms similar in shape. It should also be observed that the display or indicator 41 displays the magnitude of the difference between log $I_L$ and log $I_R$, i.e., log $I_L/I_R$, with a positive or negative value therefor, depending upon which one of the values log $I_L$ or log $I_R$ is larger than the other. Block 70 indicates the use of means for selectively attenuating a DC component of the modified signal, and may comprise a capacitor or an inductor, the latter for example forming part of a transformer.

Referring now to FIG. 7, it illustrates a somewhat different arrangement of the elements of the overall system between the monochromator 11 and detector 21. As illustrated, the positions of the sample and polarizer are reversed, so that light from the monochromator passes in sequence through the sample 19a in zone 20a, the modulator 17a and then the polarizer 15a.

This optical system operates differently from that of FIG. 1, in that substantially "randomly" polarized or "unpolarized" light, taken to consist of equal parts of left- and right-circularly polarized light, is passed through the sample 19a with unequal attenuation thereby of the circularly polarized components of opposite sense; the modulator 17a and polarizer 15a then act as a "circular-polarization analyzer," to transmit to the phototube a beam whose intensity is linearly related to, predominantly, the left- and right-circularly polarized components, in alternation, of the light transmitted by the sample 19a. Modulator 17a and polarizer 15a may be identical to the corresponding elements used in the FIG. 1 system (though some birefringent-type polarizers would also have to be reversed—that is, simply turned around—in the beam, in this optical system relative to that of FIG. 1). The resulting light intensity, and its variation with time, at the phototube are the same as for the FIG. 1 system (assuming (1) true random polarization of the light from monochromator 11, a condition which may require insertion of a diffuser or other type of polarization "scrambler" between monochromator 11 and sample 19a; or (2) some systematic compensation for nonrandom polarization of the light from monochromator 11). Consequently, for the purposes of defining the context of the present invention the two optical systems are interchangeable; i.e., the electrical signals are the same with either optical system.

In summary, the overall apparatus may be considered to include the following elements, in combination:

a. a source (such as 10) of substantially randomly polarized light of a relatively wide band of wavelength;
b. a monochromator (such as 11) disposed to receive such light and select therefrom selected light of a relatively narrow band of wavelengths, that narrow band having a nominal wavelength;
c. a polarizer (such as 15) disposed to receive the selected light and adapted to reject components thereof having linear polarizations perpendicular to an axis which is fixed in the polarizer and which is substantially perpendicular to the direction of propagation into the polarizer of the selected light;
d. a modulator element (such as 17) having cyclically varying linear birefringence, disposed to receive from the polarizer unrejected components of the selected light, and adapted to form therefrom elliptically polarized light whose ellipticity varies cyclically in correspondence with the cyclically varying birefringence, elliptically polarized light being understood to be composed of unequal amounts of circularly polarized light of opposite sense; or a modulator element such as 17a in FIG. 7 having the converse function, as earlier described in connection with FIG. 7;
e. means (such as 20) for supporting a sample 19 in position to receive the elliptically polarized light, and to transmit as an attenuated beam at least a part of the elliptically polarized light, whereby any circular-dichroic characteristic of the sample is manifested as unequal transmission of the circularly polarized components of opposite sense, and in turn whereby the intensity of the attenuated beam varies cyclically in accordance with said varying ellipticity and such unequal transmission; or means (such as 20a) for supporting a sample 19a which operates in a converse fashion upon a light beam, as earlier described in connection with FIG. 7;
f. photoelectric detector means (such as 21 plus 24) disposed to receive the attenuated beam and to produce in response thereto an electrical signal whose magnitude is substantially proportional to the intensity of the attenuated beam, whereby said magnitude varies cyclically in correspondence with the cyclically varying ellipticity and such unequal transmission;
g. an electrical amplifier (such as 29, or 26) connected to receive the signal at an input terminal and to produce in response thereto an amplified signal at an output terminal;
h. a solid-state diode (such as 28) connected in a feedback circuit between the input and output terminals, the diode having a substantially logarithmic voltage versus current characteristic over an operating range; whereby said amplified signal is substantially proportional to the logarithm of said magnitude, and in turn whereby said amplified signal varies cyclically, in correspondence with said cyclically varying ellipticity and with such unequal absorbance values of such sample for said circularly polarized components of opposite sense, each such unequal absorbance value being related to a corresponding said transmission value as:

absorbance $\equiv -\log_{10}$ (transmission);

i. display means (such as 41 plus 55a plus 60) responsive to the magnitude of cyclically varying components of said amplified signal which are present in correspondence with said cyclically varying ellipticity, for indicating a measured value of said dichroism, the magnitude of said components being substantially linearly related to the difference between such unequal absorbance values for said circularly polarized components of opposite sense, said difference being defined as such circular dichroism as follows:

circular dichroism $\equiv A_L - A_R$ where $A_L$ and $A_R$ are respectively absorbance values of such sample for left- and right-circularly polarized light;

j. scanning means (such as 12 plus 13) for continuously adjusting said monochromator to select sequentially light of different wavelength bands having successive adjacent nominal wavelengths, whereby said display means indicates a continuous sequence of said measured values corresponding respectively to said successive nominal wavelengths; and k. means (such as 12) operating synchronously with the scanning means for controlling the display means to indicate also the successive nominal wavelength, simultaneously with the corresponding measured values, whereby each of the measured values may be associated with the corresponding nominal wavelength.

It will be understood that elements (f) through (h) above may alternatively take the form described in connection with FIG. 2a.

It will further be clear to one skilled in the art that elements (b) and (c) above may be combined as in polarizing monochromators known in the art, and if desired element (d) may then be placed inside of combined elements (b) and (c), as is known, without departing from the spirit of the invention as delineated by certain of the appended claims.

In yet another embodiment within the scope of the appended claims, the synchronous filter illustrated at 40 in FIG. 1 may alternatively be a synchronous rectifier or demodulator of conventional type. Under these circumstances, (1) a DC signal from the logmatrix and synchronous rectifier will be applied at 47a and 47b, as was the rectangular-wave AC or sinusoidal AC signal produced in the earlier-discussed systems; (2) a common drive for the polarization modulator and electrical demodulator must then be substituted at 92 in the same figure; (3) the reference signal source at 56 in FIG. 4 must also be a source of DC rather than AC or rectangular-wave AC voltage; and (4) the differential amplifier at 40 should be a DC type.

With these substitutions, the bridge will operate on a DC basis, rather than a rectangular-wave AC basis. Although this has certain deficiencies relative to the AC system described earlier, it may be somewhat simpler to construct and put into operation.

Further, and still within the scope of the appended claims, the "logmatrix" principle may be used in any one of several types of differential absorbance measurements such as the measurement of "linear dichroism," or "polarized fluorescence."

Elements (a) through (k) above in any event merely represent exemplary embodiments of my invention, not intended as limiting in scope.

I claim:

1. In a circular dichroism measurement system that includes a zone to receive a dichroic sample, a light responsive detector, and means for transmitting a beam of light to the detector via the sample, said means including a polarization modulator located in the path of said beam and operable to cause the resultant output of the detector to vary cyclically in correspondence to transmission of right- and left-circularly polarized light, the improvement comprising:

signal processing means having electrical connection to the detector for processing said resultant output to obtain processed output values substantially proportional to log $I_L$ and log $I_R$, respectively, in alternating sequence; where $I_R$ = the detector output during an interval of detection of transmission of predominantly right circularly polarized light;

$I_L$ = the detector output during an interval of detection of transmission of predominantly left circularly polarized light;

the sequential alternation of output values constituting an AC output component superposed upon a DC component;

and AC circuitry responsive to said AC output component to isolate the magnitude of the difference between said processed output values;

said signal processing means and AC circuitry including a synchronous filter comprising a coupling network including a series resistance and parallel capacitors, the network also including switching operated in synchronism with the polarization modulator to effect alternating series-circuit connection of said resistance with said respective capacitors, in such manner that the AC circuitry output is characterized by a substantially rectangular wave train wherein alternate half cycles have magnitudes corresponding to the absorbance of the sample for light of left- and right-circular polarization respectively.

2. The improvement of claim 1 wherein said processing means comprises a logarithmic amplifier.

3. The improvement of claim 1 wherein said circuitry includes means to display said magnitude with a positive or negative value therefor depending upon which one of said values log $I_L$ and log $I_R$ is larger than the other.

4. The improvement of claim 1 wherein said circuitry includes a differential amplifier having first and second input terminals, a resistance bridge including a potentiometer having a movable element, a reference signal source, a drive responsive to the output of said amplifier to move said potentiometer element, said bridge being electrically connected with said reference signal source, with said amplifier input terminals, and to receive a version of said processed output in such manner that said movable element is driven to a position wherein the bridge is balanced and said position is representative of the magnitude of sample circular dichroism.

5. The improvement of claim 4 wherein said reference signal and said version of said processed output have substantially the same wave shape.

6. Apparatus to receive a sample, for measurement of circular dichroism of such sample, such sample having a characteristic transmission value for predominantly right-circularly polarized light, and a characteristic transmission value for predominantly left-circularly polarized light, said apparatus comprising:

means for generating a first electrical signal which is substantially proportional to each of such transmission values in alternation;

signal-processing means connected to receive said first signal, for producing a modified electrical signal substantially proportional within a predetermined additive constant to the logarithm of said first signal, and for extracting and processing the AC component of said modified signal to form an output signal substantially proportional to said AC component only; and display means responsive to said output signal, for indicating a measured value of such circular dichroism.

7. The apparatus of claim 6, wherein said generating means comprises:

means for producing a beam of light whose intensity is substantially proportional to each of such transmission values in alternation; and a light-sensitive detector receiving said beam of light and, in response thereto, generating said first electrical signal.

8. The apparatus of claim 7, wherein said beam-producing means comprises:

means defining a zone adapted to receive such a sample;

a source of light disposed to direct light along an optical path which traverses such zone; and in combination, a polarizing element and a cyclically variable optical retarder, disposed along said optical path, adapted to coact with a simple which may be placed in said zone and with light from said source to produce said beam of light.

9. The apparatus of claim 8, also comprising wavelength-selecting means, disposed along said optical path, for limiting the width of the band of wavelengths of said beam of light reaching said detector.

10. The apparatus of claim 9, also comprising wavelength controlling means responsive to a human operator; wherein:

said wavelength-selecting means is responsive to said wavelength-controlling means; and said display means is also responsive to said wavelength-controlling means, to also indicate a parameter of said limited-width band of wavelengths;

whereby said measured value of circular dichroism may be associated with said parameter.

11. The apparatus of claim 10, wherein:

said parameter is a nominal wavelength characterizing said limited-width band of wavelength characterizing said limited-width band of wavelengths; and said controlling means is programmable by said operator to cause said selecting means automatically to select different bands of wavelengths sequentially; whereby said display means automatically records, in association, sequential measured values of circular dichroism at said different bands of wavelengths, and the corresponding sequential values of said nominal wavelength.

12. The apparatus of claim 8, wherein:

said polarizing element receives light from said source, and produces linearly polarized light therefrom;

said variable retarder receives said linearly polarized light and produces therefrom light which is alternately predominantly right- and predominantly left-circularly polarized;

said zone is disposed along said optical path between said retarder and said detector, whereby a sample which may be positioned in said zone may receive said light from said retarder, and transmit at least some of said predominantly right- and predominantly left-circularly polarized light along said optical path toward said detector, in proportion respectively to such characteristic transmission values.

13. The apparatus of claim 8, wherein:

said zone receives substantially unpolarized light from said source, said substantially unpolarized light being regarded as consisting of left- and right-circularly polarized constituents of substantially equal intensity;

a sample which may be positioned in said zone may transmit at least some of said right- and left-circularly polarized constituents along said optical path toward said variable retarder, in proportion respectively to such characteristic transmission values;

said polarizing element has a transmission axis; and said polarizing element receives and selectively transmits, along said optical path toward said detector, said plane-polarized components predominantly corresponding alternately to said right- and left-circularly polarized constituents, with intensities as established after transmission through said zone.

14. The apparatus of claim 7, wherein said beam-producing means comprises:

a source of light disposed to direct light along an optical path; and means disposed on such optical path to receive said light and to produce therefrom elliptically polarized light which is alternately predominantly left- and predominantly right-circularly polarized, and to direct said elliptically polarized light along said optical path to such zone;

means defining a zone adapted to receive such a sample, such that a sample which may be positioned in said zone may receive said elliptically polarized light, and transmit at least some of said elliptically polarized light, in accordance with such characteristic transmission values, through said zone and along said optical path toward said detector;

elliptically polarized light transmitted through said zone forming said beam of light.

15. The apparatus of claim 7, wherein said beam-producing means comprises:

means defining a zone adapted to receive such a sample;

a source of light disposed to direct light toward said zone;

said zone-defining means being adapted to permit a sample which may be positioned in said zone to receive said light and transmit through said zone right- and left-circularly polarized constituents of said light in proportion to such characteristic transmission values; and means disposed to receive light transmitted through said zone and to produce therefrom modified light whose intensity is alternately substantially proportional to the intensities of said right- and said left-circularly polarized constituents transmitted through said zone;

said modified light forming said beam of light.

16. The apparatus of claim 6, wherein said processing means comprises:

an electrical amplifier having a first and a second terminal;

means defining a feedback path between said terminals;

an electrical element, connected in said feedback path, having a substantially logarithmic electrical response characteristic; and means for applying said first electrical signal to said first terminal;

whereby said modified signal appears at said second terminal.

17. The apparatus of claim 6, wherein said signal-processing means comprises:

means, connected to receive said modified signal, for selectively attenuating a DC component of said modified signal; and means, connected to said selectively attenuating means, for directing relatively unattenuated components of said modified signal to said display means.

18. The apparatus of claim 16, wherein said electrical element comprises a solid-state device.

19. The apparatus of claim 16, wherein said electrical element is a diode.

20. The apparatus of claim 6, wherein said processing means comprises:

an electrical amplifier connected to receive said first electrical signal and in response thereto to form a second signal, said amplifier characterized in operation by a gain parameter relating said first and second signals.

means for establishing said gain parameter;

means, responsive to said second signal, for establishing a control signal to control said gain-parameter-establishing means, so as to maintain said second signal at a substantially constant nonzero value, even if such characteristic transmission values be unequal and said first signal be thereby cyclically varying;

said gain-parameter-establishing means characterized by an approximately logarithmic variation of said control signal with said gain parameter, over an operating range; and said modified signal being produced in proportion to said control signal.

21. The apparatus of claim 20, wherein said generating means comprises:

means for producing a beam of light whose intensity is substantially proportional to each of such transmission values in alternation; and a light-sensitive detector receiving said beam of light and, in response thereto, generating said first electrical signal; and wherein:

said detector comprises the photocathode of a photomultiplier, and first electrical signal is an electron stream ejected from said photocathode;

said amplifier comprises dynodes and an anode of said photomultiplier;

said gain-establishing means comprises a voltage supply connected to apply voltages between one of said dynodes and said photocathode, and between certain of said dynodes;

said control signal being a substantially linear function of said voltages;

said second signal being an electrical current from said anode;

said control-signal-establishing means comprising amplifying means adapted to receive said current and to regulate said voltage supply.

22. The apparatus of claim 17, wherein said selectively attenuating means comprises a capacitor.

23. The apparatus of claim 17, wherein said selectively attenuating means comprises an inductor.

24. The apparatus of claim 23, wherein said inductor forms a part of a transformer.

25. A process for determination of circular dichroism in a sample, comprising the steps of:

forming a first signal alternately proportional to the transmission by such sample of light of two distinct polarization states;

treating said first signal to form therefrom a second signal substantially proportional to the logarithm of said first signal; and isolating and using a time-varying part of said second signal as a measure of such dichroism.

26. Apparatus for measuring circular dichroism in a sample, comprising:

a source of substantially randomly polarized light of a relatively wide band of wavelengths;

a monochromator disposed to receive said light and select therefrom selected light of a relatively narrow band of wavelengths, said band having a nominal wavelength;

a polarizer, disposed to receive said selected light, and adapted to reject components of said selected light having linear polarizations perpendicular to an axis which is fixed in said polarizer and which is substantially perpendicular to the direction of propagation into said polarizer of said selected light;

an element having cyclically varying linear birefringence, disposed to receive from said polarizer unrejected components of said selected light, and adapted to form therefrom elliptically polarized light whose ellipticity varies cyclically in correspondence with said cyclically varying birefringence, elliptically polarized light being understood to be composed of unequal amounts of circularly polarized light of opposite sense;

means for supporting a sample in position to receive said elliptically polarized light, and to transmit as an attenuated beam at least a part of said elliptically polarized light, whereby any circular-dichroic characteristic of such sample is manifested as unequal transmission of said circularly polarized components of opposite sense, and in turn whereby the intensity of said attenuated beam varies cyclically in accordance with said varying ellipticity and such unequal transmission;

photoelectric detector means disposed to receive said attenuated beam and to produce in response thereto an electrical signal whose magnitude is substantially proportional to said intensity of said attenuated beam, whereby said magnitude varies cyclically in correspondence with said cyclically varying ellipticity and such unequal transmission;

an electrical amplifier connected to receive said signal at an input terminal and to produce in response thereto an amplified signal at an output terminal;

a solid-state diode connected in a feedback circuit between said input and output terminals, and said diode having a substantially logarithmic voltage-vs.-current characteristic over an operating range, whereby said amplified signal is substantially proportional to the logarithm of said magnitude, and in turn whereby said amplified signal varies cyclically, in correspondence with said cyclically varying ellipticity and with such unequal absorbance of such sample for said circularly polarized components of opposite sense, each such unequal absorbance value being related to corresponding said transmission value as: absorbance $\equiv -\log_{10}$ (transmission);

AC sensitive display means, not responsive to DC components of said amplified signal, but responsive solely to the magnitude of cyclically varying components of said amplified signal which are present in correspondence with said cyclically varying ellipticity, for indicating a measured value of said dichroism, the magnitude of said varying components being substantially linearly related to the difference between such unequal absorbance values for said circularly polarized components of opposite sense, said difference being definable as such circular dichroism, circular dichroism $\equiv A_L - A_R'$ where $A_L$ and $A_R$ are respectively absorbance values of such sample for left- and right-circularly polarized light;

scanning means for continuously adjusting said monochromator to select sequentially light of different wavelength bands having successive adjacent nominal wavelengths, whereby said display means indicates a continuous sequence of said measured values corresponding respectively to said successive nominal wavelengths; and means operating synchronously with said scanning means, for controlling said display means to indicate also said successive nominal wavelengths, simultaneously with said corresponding measured values;

whereby each of said measured values may be associated with the corresponding nominal wavelength.